(12) United States Patent
Hong et al.

(10) Patent No.: US 11,011,802 B2
(45) Date of Patent: May 18, 2021

(54) BATTERY MODULE WITH SHORT-CIRCUIT UNIT, AND BATTERY PACK AND VEHICLE INCLUDING SAME

(71) Applicant: LG CHEM, LTD., Seoul (KR)

(72) Inventors: Soon-Chang Hong, Daejeon (KR); Hyo-Chan Kim, Daejeon (KR); Hang-June Choi, Daejeon (KR); Kye-Yeon Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 255 days.

(21) Appl. No.: 16/336,337

(22) PCT Filed: Jun. 11, 2018

(86) PCT No.: PCT/KR2018/006604
§ 371 (c)(1),
(2) Date: Mar. 25, 2019

(87) PCT Pub. No.: WO2018/230907
PCT Pub. Date: Dec. 20, 2018

(65) Prior Publication Data
US 2019/0245186 A1    Aug. 8, 2019

(30) Foreign Application Priority Data
Jun. 15, 2017    (KR) .................... 10-2017-0076020

(51) Int. Cl.
*H01M 2/20*    (2006.01)
*F16H 19/04*    (2006.01)
(Continued)

(52) U.S. Cl.
CPC .......... *H01M 50/502* (2021.01); *F16H 19/04* (2013.01); *H01M 10/4235* (2013.01);
(Continued)

(58) Field of Classification Search
CPC ............ H01M 50/572; H01M 50/578; H01M 2200/20; H01M 50/581
See application file for complete search history.

(56) References Cited

U.S. PATENT DOCUMENTS

2006/0012334 A1*    1/2006    Watson ............... H01M 50/572
                                                    320/112
2006/0093896 A1*    5/2006    Hong .................. H01M 10/425
                                                    429/61
(Continued)

FOREIGN PATENT DOCUMENTS

EP    2284929 A1    2/2011
EP    3540822 A1    9/2019
(Continued)

OTHER PUBLICATIONS

European Search Report issued in EP Application 18817230.8, dated Apr. 3, 2020.
(Continued)

*Primary Examiner* — Imran Akram
(74) *Attorney, Agent, or Firm* — Birch, Stewart, Kolasch & Birch, LLP

(57) ABSTRACT

A battery module including a first bus bar electrically connected to a first electrode lead of a first battery cell; a second bus bar electrically connected to a second electrode lead of a second battery cell; a short-circuit unit moving toward the first bus bar and the second bus bar by receiving an expansive force due to a volume increase of at least one of the first battery cell and the second battery cell to electrically connect the first bus bar to the second bus bar to generate a short circuit; and a cartridge accommodating or supporting at least a portion of the first electrode lead, the second electrode lead, the first bus bar, the second bus bar and the short-circuit unit.

12 Claims, 12 Drawing Sheets

(51) Int. Cl.
    *H01M 2/34*    (2006.01)
    *H01M 10/42*    (2006.01)
    *H01M 50/502*    (2021.01)
    *H01M 50/20*    (2021.01)
    *H01M 50/572*    (2021.01)

(52) U.S. Cl.
    CPC ......... *H01M 50/20* (2021.01); *H01M 50/572*
        (2021.01); *H01M 2200/00* (2013.01); *H01M*
        *2200/20* (2013.01); *H01M 2220/20* (2013.01)

(56) References Cited

U.S. PATENT DOCUMENTS

| | | | |
|---|---|---|---|
| 2007/0054157 | A1 | 3/2007 | Ryu et al. |
| 2008/0036561 | A1* | 2/2008 | Hartinger ............. H01H 1/0015 335/156 |
| 2010/0227205 | A1* | 9/2010 | Byun ................. H01M 50/543 429/61 |
| 2011/0037430 | A1* | 2/2011 | Jang ...................... H02J 7/0029 320/109 |
| 2011/0039147 | A1* | 2/2011 | Cheon ................ H01M 50/572 429/159 |
| 2011/0189515 | A1* | 8/2011 | Yoon ................. H01M 10/0413 429/61 |
| 2013/0337297 | A1 | 12/2013 | Lee et al. |
| 2014/0127549 | A1* | 5/2014 | Roh .................... H01M 50/502 429/150 |
| 2014/0186664 | A1 | 7/2014 | Park |
| 2014/0186667 | A1 | 7/2014 | Lee et al. |
| 2014/0248523 | A1 | 9/2014 | Roh et al. |
| 2015/0000991 | A1* | 1/2015 | Lim .................... H01M 50/572 180/65.31 |
| 2015/0171480 | A1 | 6/2015 | Seo et al. |
| 2016/0379790 | A1* | 12/2016 | Boehme ................. H01H 79/00 335/12 |
| 2017/0033332 | A1 | 2/2017 | Sakai et al. |

FOREIGN PATENT DOCUMENTS

| | | | |
|---|---|---|---|
| JP | 2001-524255 | A | 11/2001 |
| JP | 2004-319463 | A | 11/2004 |
| JP | 2010-205728 | A | 9/2010 |
| JP | 2011-40368 | A | 2/2011 |
| JP | 2014-523627 | A | 9/2014 |
| JP | 2014-533424 | A | 12/2014 |
| JP | 2015-118792 | A | 6/2015 |
| JP | 2015-207442 | A | 11/2015 |
| KR | 10-2012-0128552 | A | 11/2012 |
| KR | 10-2013-0043258 | A | 4/2013 |
| KR | 10-2014-0028943 | A | 3/2014 |
| KR | 10-2014-0039451 | A | 4/2014 |
| KR | 10-2014-0042269 | A | 4/2014 |
| KR | 10-2014-0084824 | A | 7/2014 |
| KR | 10-1449307 | B1 | 10/2014 |
| KR | 10-1500222 | B1 | 3/2015 |
| KR | 10-1546545 | B1 | 8/2015 |
| KR | 10-2016-0026469 | A | 3/2016 |
| KR | 10-2016-0030688 | A | 3/2016 |
| KR | 10-2017-0016065 | A | 2/2017 |

OTHER PUBLICATIONS

International Search Report (PCT/ISA/210) issued in PCT/KR2018/006604, dated Oct. 4, 2018.

* cited by examiner

US 11,011,802 B2

BATTERY MODULE WITH SHORT-CIRCUIT UNIT, AND BATTERY PACK AND VEHICLE INCLUDING SAME

TECHNICAL FIELD

The present disclosure relates to a battery module, and a battery pack and a vehicle including the same, and more particularly, to a battery module having improved stability by preventing overcharge of the battery module, and a battery pack and a vehicle including the same.

The present application claims priority to Korean Patent Application No. 10-2017-0076020 filed on Jun. 15, 2017 in the Republic of Korea, the disclosures of which are incorporated herein by reference.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries commercially available at the present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-discharging rate and high energy density.

The lithium secondary battery mainly uses lithium-based oxide and carbonaceous material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery case, in which the electrode assembly is accommodated and sealed together with an electrolyte.

Generally, a lithium secondary battery may be classified into a can-type secondary battery in which an electrode assembly is included in a metal can and a pouch-type secondary battery in which an electrode assembly is included in a pouch made of aluminum laminate sheets, depending on the shape of an exterior.

In recent years, secondary batteries have been widely used not only in small-sized devices such as portable electronic devices but also in medium-sized and large-sized devices such as vehicles and power storage devices. In particular, as carbon energy is getting depleted and the interest in the environment is increasing, the attention is focused on hybrid electric vehicles and electric vehicles around the world including the US, Europe, Japan and Korea. The most important component of the hybrid electric vehicles and electric vehicles is a battery pack that gives a drive power to a vehicle motor. Since the hybrid electric vehicle or electric vehicle is able to obtain a driving force of the vehicle through charging and discharging of the battery pack, the fuel efficiency is higher than that of a vehicle using only an engine, and pollutants may be reduced or substantially eliminated. For these reasons, the hybrid electric vehicles and electric vehicles are used more and more. In addition, the battery pack of the hybrid electric vehicle or electric vehicle includes a plurality of secondary batteries, and the plurality of secondary batteries are connected in series and in parallel to improve capacity and power.

The secondary battery has excellent electrical characteristics, but in the abnormal operating conditions such as overcharge, overdischarge, exposure to high temperature and electrical short circuit, the decomposition reaction of an active material, an electrolyte and the like of the battery is caused to generate heat and gas, thereby resulting in a so-called swelling phenomenon where the secondary battery swells. The swelling phenomenon accelerates the decomposition reaction, which may cause explosion and ignition of the secondary battery due to thermal runaway.

Thus, the secondary battery includes a safety system such as a protection circuit for cutting a current at overcharge, overdischarge or overcurrent, a positive temperature coefficient (PTC) element for cutting a current by greatly increasing resistance when temperature rises, a safety vent for cutting a current or venting a gas when pressure increases due to gas generation.

In particular, in the conventional art, in order to ensure the safety of the battery pack even if a swelling phenomenon occurs, an electrical connecting member that is cut off by a physical change when the volume of secondary batteries expands has been studied.

However, even if the electrical connecting member is used, it is difficult to surely cut the current of the secondary battery when the secondary batteries are expanded over a certain volume.

In addition, the secondary battery repeats expansion and contraction even when it is in a normal operating state, not in an abnormal operating state, and thus the current of the secondary battery may be cut even in a normal operation range, which may deteriorate the operation reliability.

DISCLOSURE

Technical Problem

The present disclosure is directed to providing a battery module, which may prevent overcharge by fracturing a fracturing portion formed at a first bus bar since a short-circuit unit moves toward a first bus bar and a second bus bar and comes into contact thereto by receiving an expansive force due to the volume increase of at least one of a first battery cell and a second battery cell to electrically connect the first bus bar and the second bus bar and thus cause a short circuit, and to providing a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a first bus bar electrically connected to a first electrode lead of a first battery cell; a second bus bar electrically connected to a second electrode lead of a second battery cell; a short-circuit unit configured to move toward the first bus bar and the second bus bar by receiving an expansive force due to a volume increase of at least one of the first battery cell and the second battery cell to electrically connect the first bus bar to the second bus bar to generate a short circuit; and a cartridge configured to accommodate or support at least a portion of the first electrode lead, the second electrode lead, the first bus bar, the second bus bar and the short-circuit unit.

Preferably, the short-circuit unit may include: an elastic member having a first end supported to an inner side of the cartridge and configured to provide an elastic force in a direction opposite to a direction of the expansive force; a slide bar having a short-circuit terminal provided at a first end of the slide bar to contact a second end of the elastic member opposite the first end of the elastic member and receive the elastic force from the elastic member, the slide bar having a rack gear formed along a surface of a second end of the slide bar opposite to the first end of the slide bar; and an expansive force transmitting unit having a pinion gear provided at a first end of the expansive force transmitting unit to engage with the rack gear and support the second end of the slide bar, the expansive force transmitting unit having a second end opposite to the first end of the expansive force transmitting unit, wherein the second end of the expansive force transmitting unit is in contact with one end of each of the first battery cell and the second battery cell to receive the expansive force.

Preferably, the short-circuit unit may include: an elastic member having one end supported to an inner side of the cartridge and configured to provide an elastic force in a direction opposite to the expansive force; a slide bar having a short-circuit terminal provided at one end thereof to contact the other end of the elastic member and receive the elastic force from the elastic member, the slide bar having a rack gear formed along a surface of the other end thereof; and an expansive force transmitting unit having a pinion gear provided at one end thereof to engage with the rack gear and support the other end of the slide bar, the expansive force transmitting unit having the other end that is in contact with one end of each of the first battery cell and the second battery cell to receive the expansive force.

Preferably, when the volume of both the first battery cell and the second battery cell does not increase, the slide bar may receive only the elastic force so that the short-circuit terminal is spaced apart from the first battery cell and the second battery cell.

Preferably, when the volume of at least one of the first battery cell and the second battery cell increases, the expansive force transmitting unit may receive the expansive force to move toward the first bus bar and the second bus bar and transmit the received expansive force to the slide bar through the rack gear engaged with the pinion gear.

Preferably, when the volume of at least one of the first battery cell and the second battery cell increases, the slide bar may receive the expansive force through the rack gear engaged with the pinion gear to move toward the first bus bar and the second bus bar.

Preferably, the short-circuit terminal may come into contact with the first bus bar and the second bus bar and electrically connect the first bus bar and the second bus bar to generate a short circuit.

Preferably, the short-circuit terminal may be made of a conductive material.

Preferably, the cartridge may have an accommodation portion formed therein with a shape corresponding to a shape of the short-circuit unit to accommodate the short-circuit unit therein.

Preferably the accommodation portion may correspond to the volume of the elastic member according to a restoring state of the elastic member.

Preferably, the cartridge may support at least a portion of each of the first electrode lead and the first bus bar that are in surface contact with each other and are electrically connected, and support at least a portion of each of the second electrode lead and the second bus bar that are in surface contact with each other and are electrically connected.

Preferably, at least one of the first bus bar and the second bus bar may further include a fracturing portion that is fractured to cut an electric connection to the outside when the short circuit is generated.

A battery pack according to the present disclosure may include the battery module.

A vehicle according to the present disclosure may include the battery module.

Advantageous Effects

According to the present disclosure, a first bus bar and a second bus bar are electrically connected by means of an expansive force due to the volume increase of at least one of a first battery cell and a second battery cell to cause a short circuit, and thus a fracturing portion formed at any one of the first bus bar and the second bus bar is fractured to prevent overcharge of the battery module, thereby improving the stability of the battery module.

BEST MODE

Figure 1:
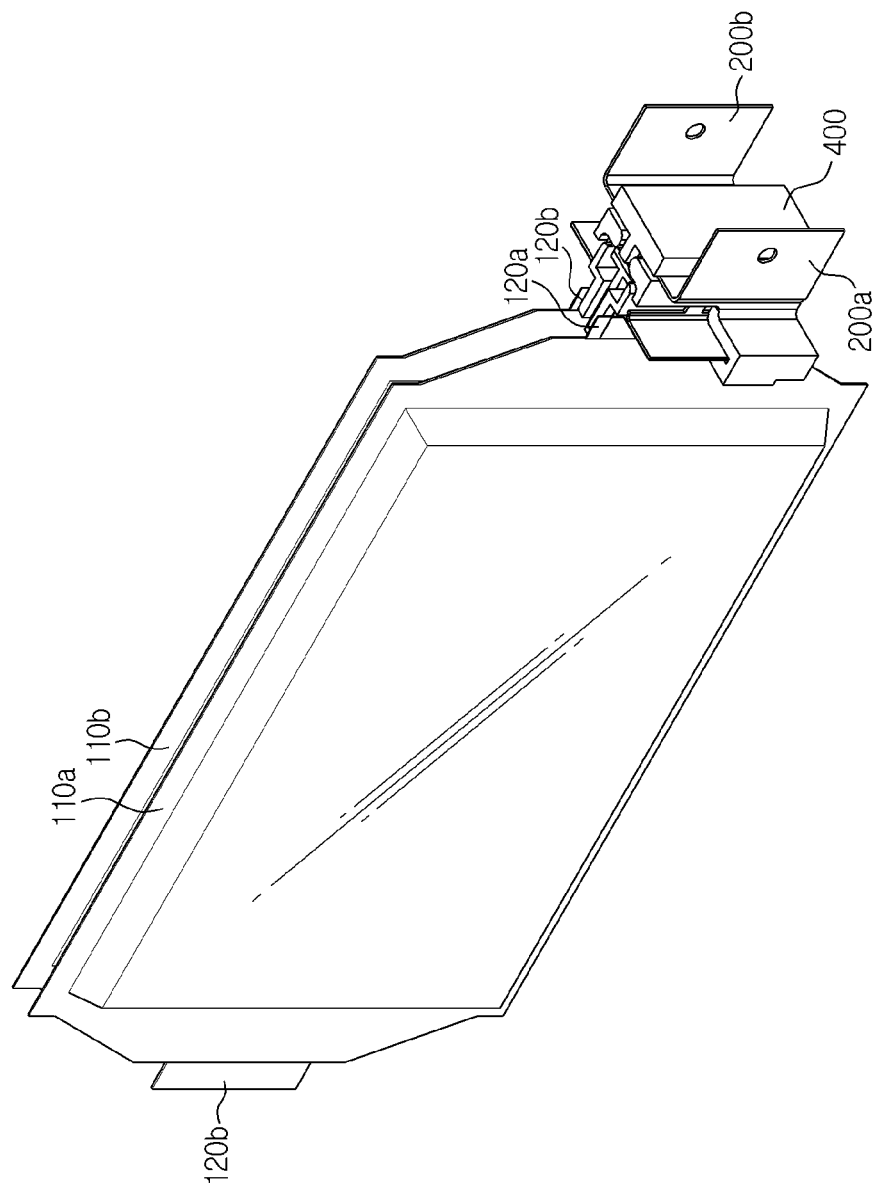
FIG. 1 is a perspective view showing a battery module according to an embodiment of the present disclosure.

The above objects, features and advantages will be described in detail below with reference to the accompanying drawings, so that those skilled in the art to which the present disclosure belongs can easily implement the technical idea of the present disclosure. In the explanations of the present disclosure, if it is deemed that any specific explanation of the related technology can unnecessarily obscure the gist of the present disclosure, the detailed explanation may be omitted. Hereinafter, a preferred embodiment according to the present disclosure will be described in detail with reference to the accompanying drawings. In the drawings, the same reference numerals are used to indicate the same or similar components.

Figure 2:
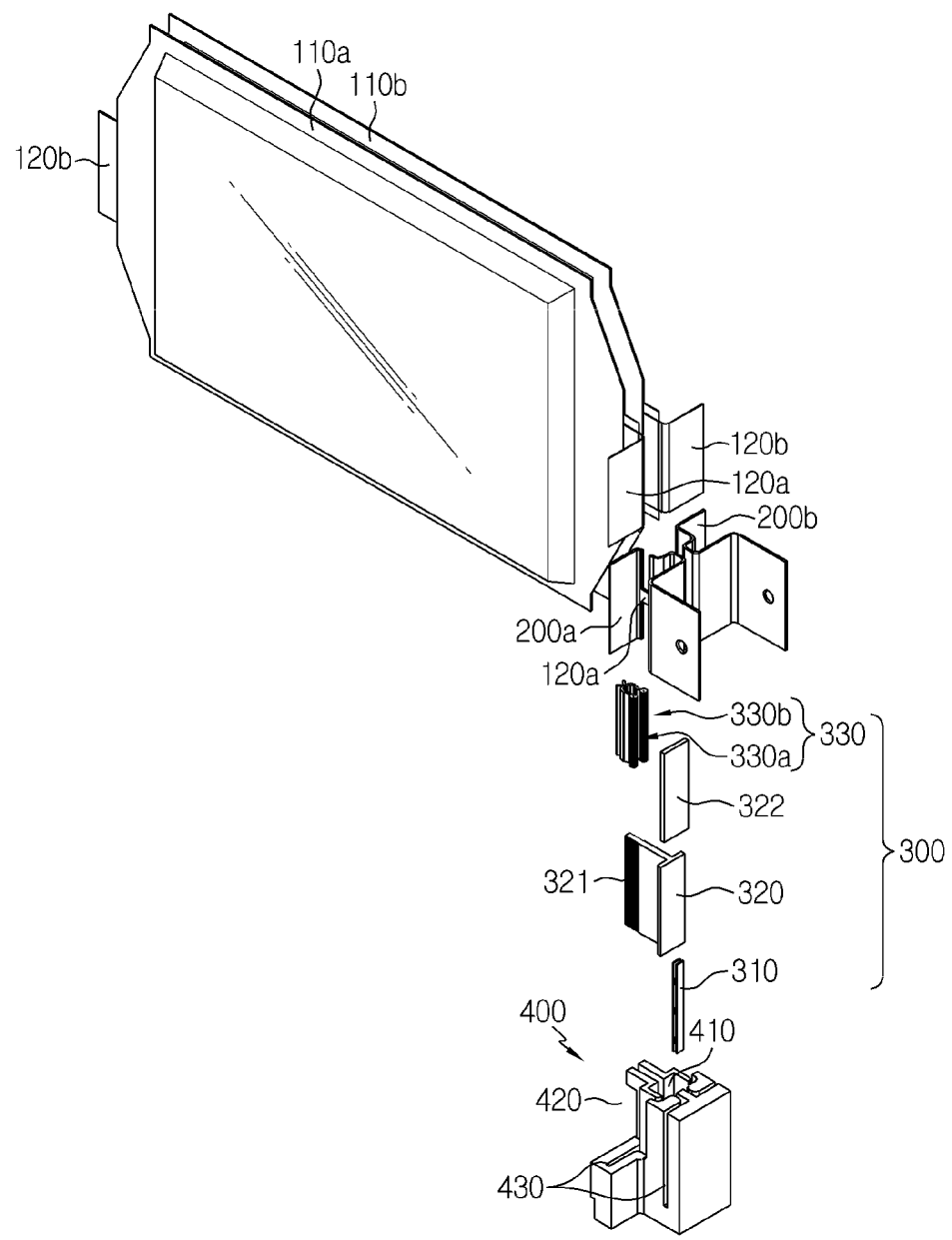
FIG. 2 is an exploded perspective view showing a battery module according to an embodiment of the present disclosure.
Figure 3:
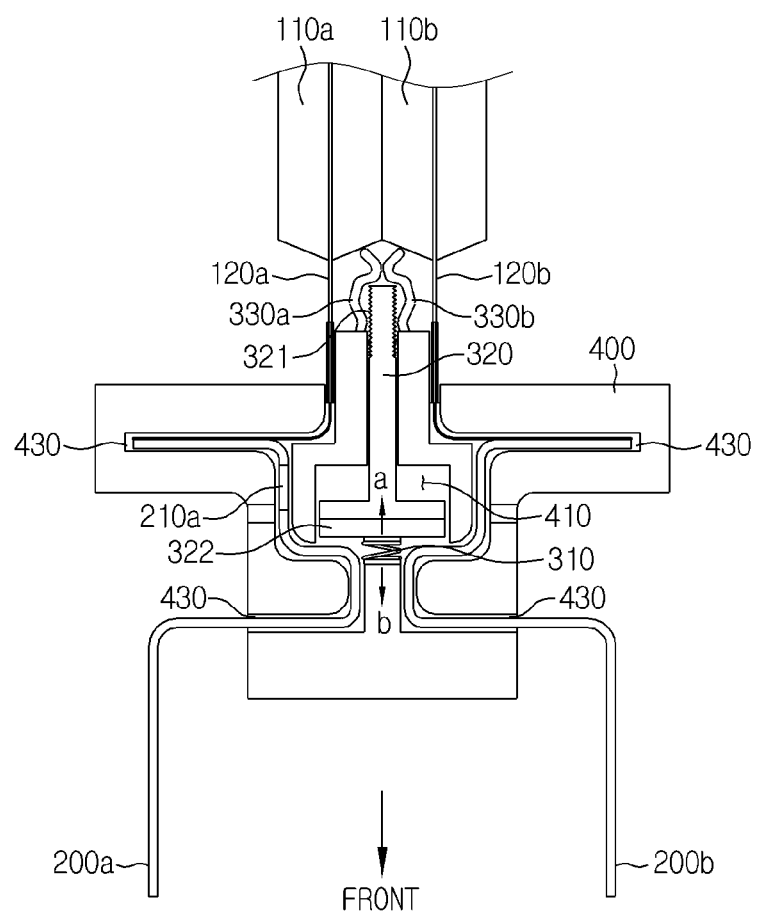
FIG. 3 is a diagram showing the battery module according to an embodiment of the present disclosure before its volume increases.

FIG. 1 is a perspective view showing a battery module according to an embodiment of the present disclosure, FIG. 2 is an exploded perspective view showing a battery module according to an embodiment of the present disclosure, and FIG. 3 is a diagram showing the battery module according to an embodiment of the present disclosure before its volume increases.

Referring to FIGS. 1 to 3, a battery module according to an embodiment of the present disclosure may include a battery cell 110a, 110b, a bus bar 200a, 200b, a short-circuit unit 300 and a cartridge 400.

The battery cell 110a, 110b may be provided in plural, and the battery cells 110a, 110b may be stacked side by side in the right and left direction.

The kind of the battery cell 110a, 110b is not specially limited, and various kinds of secondary batteries may be used for the battery module according to the present disclosure. For example, the battery cell 110a, 110b may be a lithium ion battery, a lithium polymer battery, a nickel cadmium battery, a nickel hydride battery, a nickel zinc battery, or the like. In particular, the battery cell 110a, 110b may be a lithium secondary battery.

Meanwhile, the battery cell 110a, 110b may be classified into a pouch type, a cylindrical type, a rectangular type and the like, depending on its exterior. In particular, the battery cell 110a, 110b of the battery module according to the present disclosure may be a pouch-type secondary battery.

If the battery cell 110a, 110b is implemented using a pouch-type secondary battery, as shown in FIG. 2, each battery cell 110a, 110b has broad surfaces at right and left sides thereof, and the broad surfaces of the battery cells 110a, 110b may be provided to face to each other. In addition, in this case, each battery cell 110a, 110b may include an electrode lead 120a, 120b that is bent while protruding toward the front.

The electrode lead 120a, 120b may include a positive electrode lead and a negative electrode lead. The positive electrode lead may be connected to a positive electrode plate of an electrode assembly, and the negative electrode lead may be connected to a negative electrode plate of the electrode assembly.

Meanwhile, the battery cell 110a, 110b according to the present disclosure may include a first battery cell 110a located at a left side and a second battery cell 110b located at a right side. At this time, the electrode leads of the first battery cell 110a and the second battery cell 110b may be disposed so that the electrode leads 120a, 120b having the different polarity are oriented in the same direction.

More specifically, as shown in FIG. 2, the first battery cell 110a may be disposed so that the first electrode lead 120a having a positive polarity is oriented to the front direction, and the second battery cell 110b may be disposed so that the second electrode lead 120b having a negative polarity is oriented to the front direction.

In addition, the first battery cell 110a may be disposed so that the second electrode lead 120b having a negative polarity is oriented to the rear direction, and the second battery cell 110b may be disposed such that the first electrode lead 120a having a positive polarity is oriented to the rear direction.

At this time, the second electrode lead 120b of the first battery cell 110a and the first electrode lead 120a of the second battery cell 110b may be electrically connected.

Meanwhile, the first electrode lead 120a of the first battery cell 110a may electrically connected to the first bus bar 200a, explained later, to receive a positive voltage from an external power source. In addition, the second electrode lead 120b of the second battery cell 110b may be electrically connected to the second bus bar 200b, explained later, to receive a negative voltage from the external power source.

Here, the first bus bar 200a may be a bus bar that is electrically connected to the first electrode lead 120a of the first battery cell 110a, among the bus bars 200a, 200b according to the present disclosure, and the second bus bar 200b may be a bus bar that is electrically connected to the second electrode lead 120b of the second battery cell 110b, among the bus bars 200a, 200b according to the present disclosure.

Hereinafter, the connection structure between the first electrode lead 120a of the first battery cell 110a and the first bus bar 200a and the connection structure between the second electrode lead 120b of the second battery cell 110b and the second bus bar 200b according to the present disclosure will be described in detail.

Figure 4:
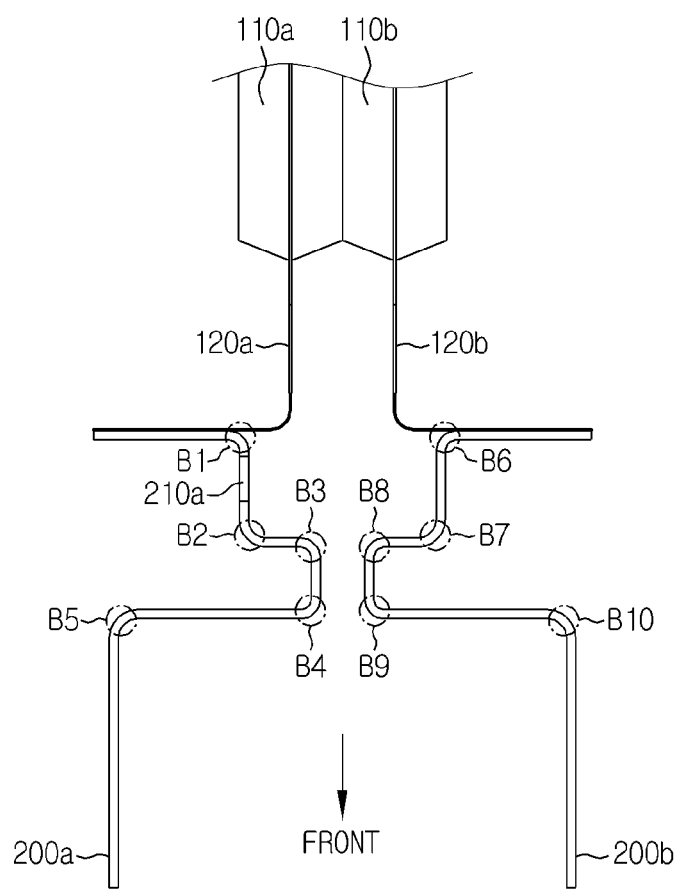
FIG. 4 is a diagram showing only a first battery cell, a first bus bar, a second battery cell and a second bus bar of the battery module according to an embodiment of the present disclosure.

FIG. 4 is a diagram showing only a first battery cell, a first bus bar, a second battery cell and a second bus bar of the battery module according to an embodiment of the present disclosure.

Referring to FIG. 4 further, the first electrode lead 120a of the first battery cell 110a may protrude toward the front from the first battery cell 110a and be bent about perpendicular toward the outside of the battery module to be in surface contact with the first bus bar 200a.

In addition, the second electrode lead 120b of the second battery cell 110b may protrude toward the front from the second battery cell 110b and be bent at about a right angle in an outer direction of the battery module, namely in a direction opposite to the bending direction of the first electrode lead 120a of the first battery cell 110a, to make surface contact with the second bus bar 200b.

The first bus bar 200a and the second bus bar 200b may have a shape in which a plate elongated in a vertical direction is bent several times at a right angle.

More specifically, the first bus bar 200a may include a first bending portion B1 that is in surface contact with the first electrode lead 120a of the first battery cell 110a and bent perpendicularly toward the front, a second bending portion B2 extending from the first bending portion B1 and bent toward the inside of the battery module, a third bending portion B3 extending from the second bending portion B2 and bent toward the front of the battery module, a fourth bending portion B4 extending from the third bending portion B3 and bent toward the outside of the battery module, and a fifth bending portion B5 extending from the fourth bending portion B4 and bent toward the front of the battery module.

In addition, the second bus bar 200b may include a sixth bending portion B6 that is in contact with the second electrode lead 120b of the second battery cell 110b and bent toward the front, a seventh bending portion B7 extending from the sixth bending portion B6 and bent toward the inside of the battery module, an eighth bending portion B8 extending from the seventh bending portion B7 and bent toward the front of the battery module, a ninth bending portion B9 extending from the eighth bending portion B8 and bent toward the outside of the battery module, and tenth bending portion B10 extending from the ninth bending portion B9 and bent toward the front of the battery module.

At this time, the first bus bar 200a and the second bus bar 200b may be bent from the second bending portion B2 and the seventh bending portion B7 and extend toward each other to reduce the separation distance, and may be bent from the third bending portion B3 and the eighth bending portion B8 toward the front of the battery module to maintain the separation distance.

By doing so, the third bending portion B3 of the first bus bar 200a and the eighth bending portion B8 of the second bus bar 200b are located close to each other. Thus, even though a short-circuit terminal 322 (FIG. 3) formed at the other end of a slide bar 320 (FIG. 3) of the short-circuit unit 300 (FIG. 3) has a short width, the short-circuit terminal 322 may simultaneously contact the first bus bar 200a and the second bus bar 200b to electrically short-circuit the first bus bar 200a and the second bus bar 200b.

Meanwhile, the first electrode lead 120a of the first battery cell 110a and the first bus bar 200a may be partly inserted into and supported by a support groove 430 (FIG. 2) of the cartridge 400 (FIG. 2), explained later, in a state of being surface-contacted and electrically connected to each other.

In addition, the second electrode lead 120b of the second battery cell 110b and the second bus bar 200b may be partly inserted into and supported by the supporting groove 430 (FIG. 2) of the cartridge 400 (FIG. 2), explained later, in a state of being surface-contacted and electrically connected to each other.

The cartridge 400 (FIG. 2) will be described later in detail.

Figure 5:
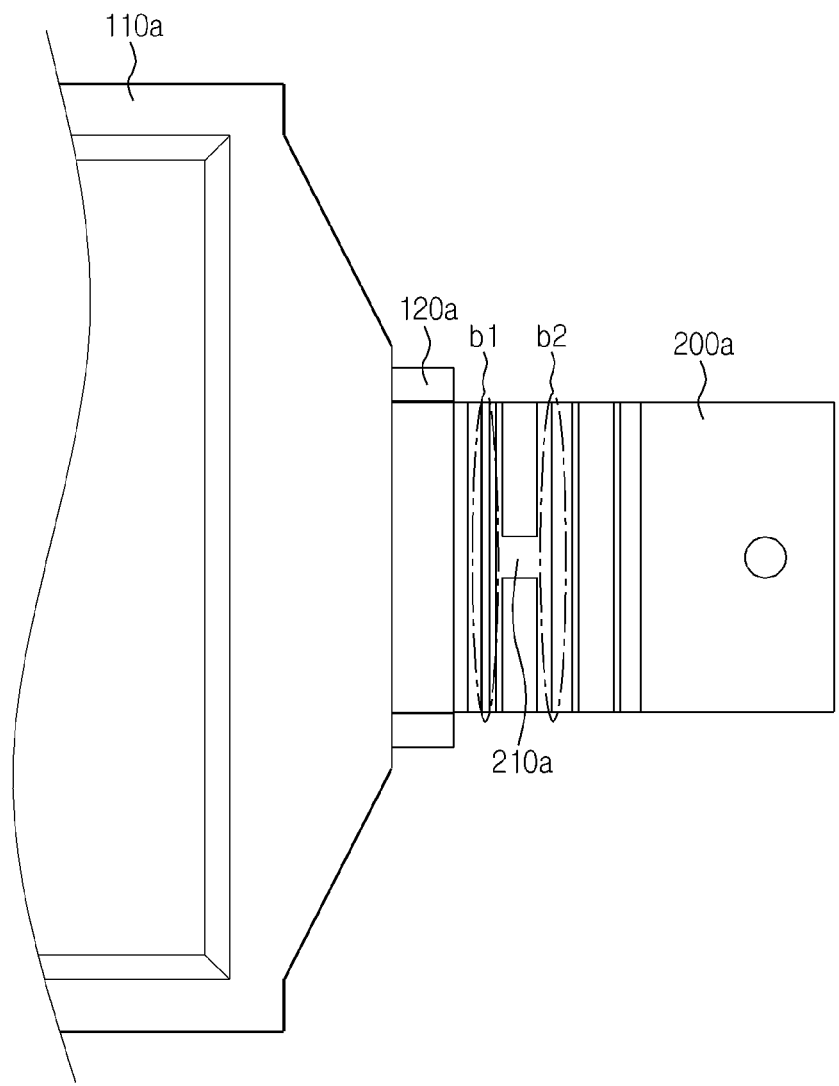
FIG. 5 is a diagram showing a side of the battery module according to an embodiment of the present disclosure before a fracturing portion is fractured.
Figure 6:
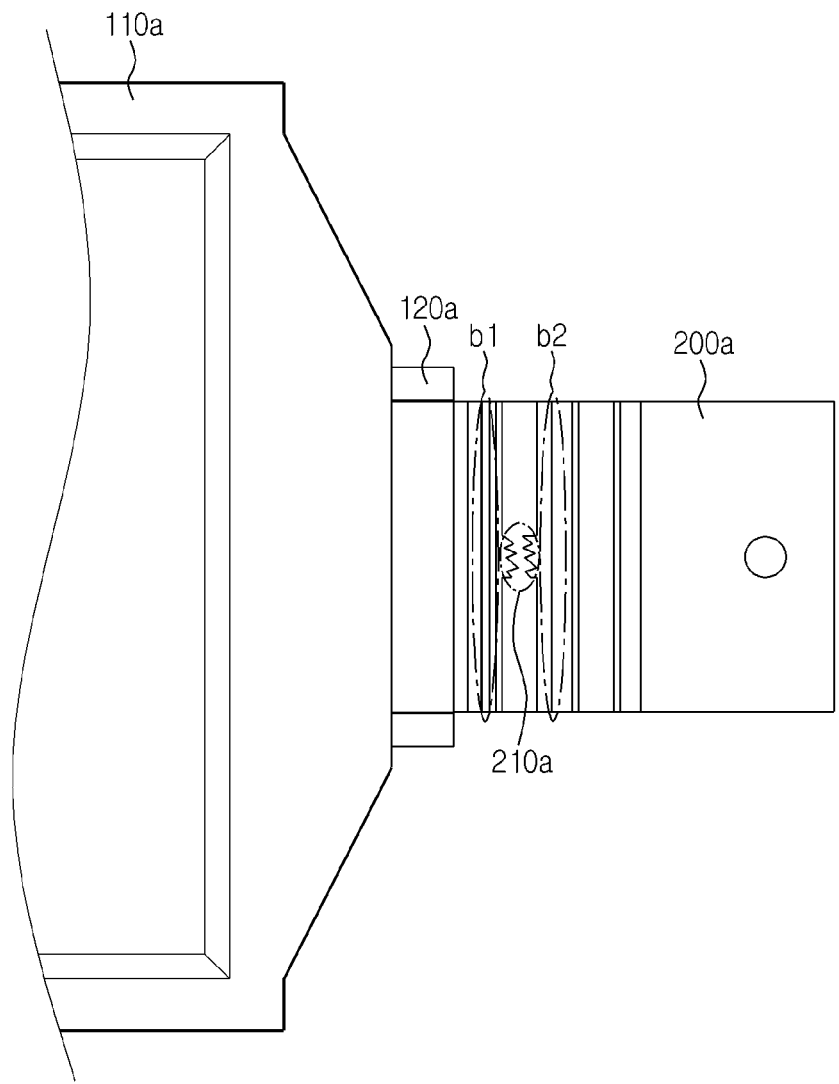
FIG. 6 is a diagram showing a side of the battery module according to an embodiment of the present disclosure after a fracturing portion is fractured.

FIG. 5 is a diagram showing a side of the battery module according to an embodiment of the present disclosure before a fracturing portion is fractured, and FIG. 6 is a diagram showing a side of the battery module according to an embodiment of the present disclosure after a fracturing portion is fractured.

Referring to FIGS. 5 and 6 further, the first bus bar 200a may have a fracturing portion 210a that is formed in a region between the first bending portion B1 and the second bending portion B2 and has a narrower sectional area than the outer region between the first bending portion B1 and the second bending portion B2.

Since the fracturing portion 210a has a narrower sectional area than the outer region between the first bending portion B1 and the second bending portion B2, the resistance may be increased.

Accordingly, if the first bus bar 200a and the second bus bar 200b (FIG. 3) are electrically connected to form a short circuit between the first bus bar 200a and the second bus bar 200b (FIG. 3), as shown in FIG. 6, an overcurrent flows to the first bus bar 200a to generate a high-temperature resistance heat, so that the fracturing portion 210a may be fractured.

By doing so, in the battery module according to the present disclosure, if the first bus bar 200a and the second bus bar 200b (FIG. 3) are electrically connected to generate a short circuit, a fracturing portion 210a of the first bus bar 200a that electrically connect the first electrode lead 120a of the first battery cell 110a and an external power source may be fractured to stop charging.

In other words, the battery module according to the present disclosure may apply the expansive force generated by a volume increase due to overcharge of the first battery cell 110a to the short-circuit unit 300 (FIG. 3) to electrically connect the first bus bar 200a and the second bus bar 200b (FIG. 3). Subsequently, as the fracturing portion 210a of the first bus bar 200a is fractured due to the short circuit of high current flowing at the first bus bar 200a and the second bus bar 200b (FIG. 3), the battery module according to the present disclosure may stop charging to prevent the overcharge of the battery module from progressing.

Meanwhile, even though it is illustrated that the fracturing portion 210a of the battery module according to an embodiment of the present disclosure is formed at the first bus bar 200a, a fracturing portion of a battery module according to another embodiment of the present disclosure may be formed at the second bus bar, and a fracturing portion of a battery module according to still another embodiment of the present disclosure may be formed at both the first bus bar and the second bus bar.

In addition, the fracturing portion 210a may be formed to have a narrower width than the adjacent region as described above. However, without being limited thereto, the fracturing portion 210a may be made of a metal having a melting point lower than that of the adjacent region, and the fracturing portion 210a may adopt any configuration as long as it is able to function as a fuse.

Hereinafter, the short-circuit unit 300 will be described in detail.

Figure 7:
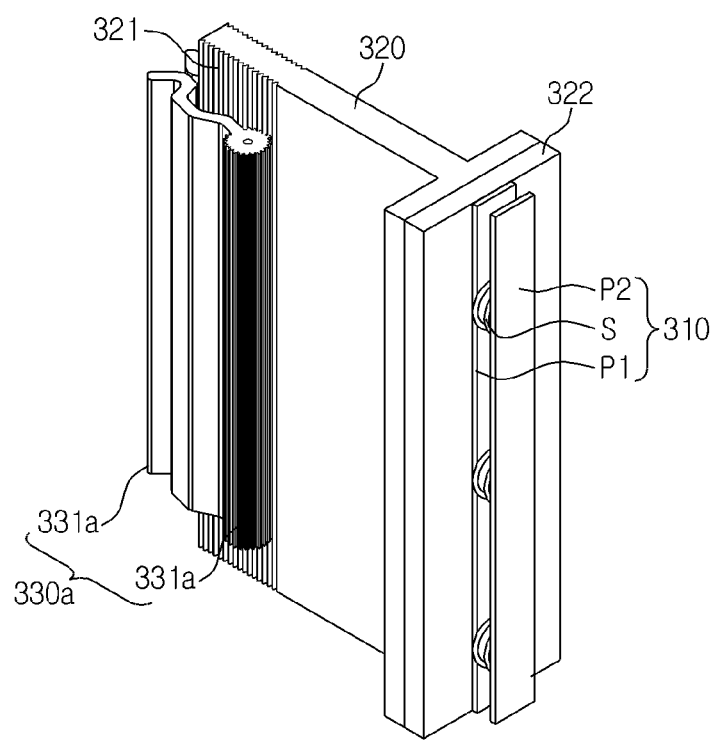
FIG. 7 is a perspective view showing a short-circuit unit of the battery module according to an embodiment of the present disclosure.
Figure 8:
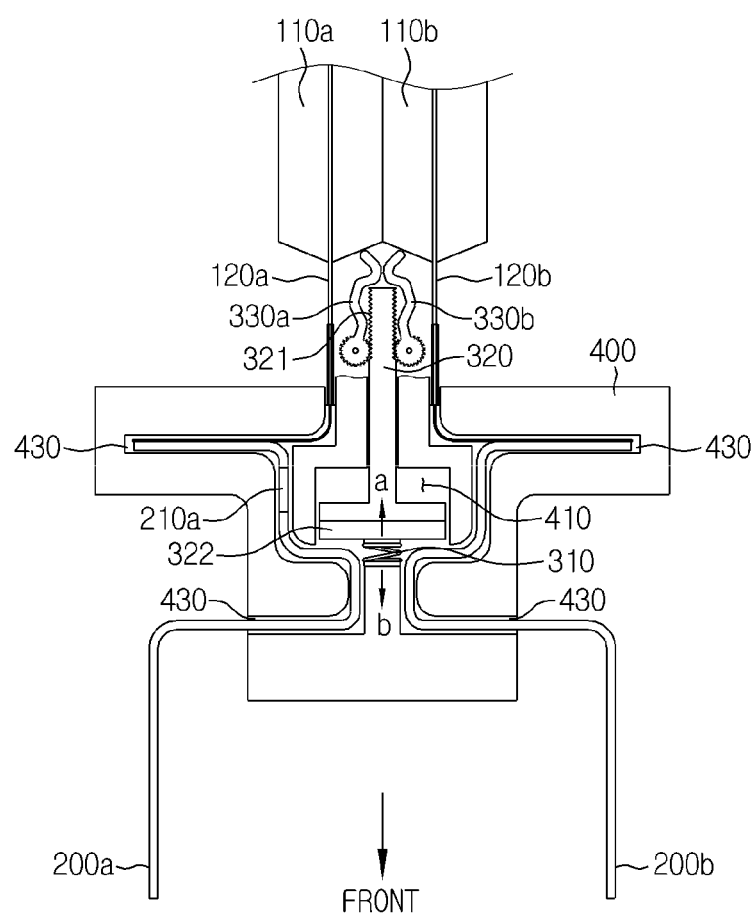
FIG. 8 is a diagram showing a top surface of the battery module according to an embodiment of the present disclosure, where a cartridge among components of the battery module is partially sectioned.

FIG. 7 is a perspective view showing a short-circuit unit of the battery module according to an embodiment of the present disclosure, and FIG. 8 is a diagram showing a top surface of the battery module according to an embodiment of the present disclosure, where a cartridge among components of the battery module is partially sectioned.

Referring to FIGS. 7 and 8, the short-circuit unit 300 may cause a short circuit by receiving an expansive force due to a volume increase of at least one of the first battery cell 110a and the second battery cell 110b to move toward the first bus bar 200a and the second bus bar 200b and contact the first bus bar 200a and the second bus bar 200b.

To this end, the short-circuit unit 300 may include an elastic member 310, a slide bar 320 and expansive force transmitting units 330a, 330b.

As shown in FIG. 8, one end of the elastic member 310 may be supported to the inner side of the cartridge 400 to provide an elastic force in a direction opposite to the expansive force.

More specifically, the elastic member 310 may be formed so that a spring S is inserted between a first plate P1 contacting one end of the slide bar 320 and a second plate P2 contacting the inner side of the cartridge 400, to provide an elastic force in a direction (a) toward the slide bar 320 and in a direction (b) toward the cartridge 400.

At this time, the slide bar 320 may have a short-circuit terminal 322 that contacts the first plate P1 of the elastic member 310 at one end to which the elastic force is applied from the elastic member 310.

That is, the short-circuit terminal 322 having a plate shape provided at one end of the slide bar 320 may be in surface contact with the first plate P1 of the elastic member 310 to receive an elastic force in the direction (a).

Meanwhile, the slide bar 320 may have a rack gear 321 provided at the other end thereof and having a plurality of protrusions protruded along the surface thereof.

More specifically, the slide bar 320 may include a first plate elongated from the other end to one end and a second plate perpendicularly contacting the first plate at one end of the first plate. That is, the slide bar 320 may be formed to have a 'T' shape as two plates are in contact perpendicularly.

Here, the rack gear 321 described above is formed at the surface of the other end of the first plate, and the rack gear 321 may have a plurality of protrusions.

The expansive force transmitting units 330a, 330b include a first expansive force transmitting unit 330a that contacts the rack gear 321 at a left surface among the surfaces of the slide bar 320 at the other end thereof, and a second expansive force transmitting unit 330b that contacts the rack gear 321 formed at a right surface.

The first expansive force transmitting unit 330a and the second expansive force transmitting unit 330b have the same components and function and may be shaped symmetrically in the right and left direction from one end to the other end thereof.

Accordingly, in order to avoid repetitive explanations, only the first expansive force transmitting unit 330a will be described on behalf of the expansive force transmitting units 330a, 330b.

The first expansive force transmitting unit 330a may include a pinion gear 331a provided at one end thereof to engage with the rack gear 321 and support the other end of the slide bar 320.

More specifically, the pinion gear 331a provided at one end of the first expansive force transmitting unit 330a has a disk shape, and a plurality of projections may be formed along the outer circumference of the disk.

Accordingly, the plurality of projections of the pinion gear 331a may be inserted between the plurality of projections of the rack gear 321 to fix and support the first expansive force transmitting unit 330a to the slide bar 320.

Meanwhile, the other end of the first expansive force transmitting unit 330a may come into contact with one end of the first battery cell 110a to receive an expansive force when the volume of the first battery cell 110a increases.

At this time, a plurality of bent portions may be formed between one end and the other end of the first expansive force transmitting unit 330a and be disposed in a space formed between the first battery cell 110a and the slide bar 320.

That is, the other end of the slide bar 320 is gear-coupled with the first expansive force transmitting unit 330a and the second expansive force transmitting unit 330b which are in contact with the first battery cell 110a and the second battery cell 110b, respectively, and an elastic force may be applied to one end of the slide bar 320 from the elastic member 310 in contact with the inner side of the cartridge 400.

By doing so, if both the first battery cell 110a and the second battery cell 110b are not swelled, the short-circuit terminal 322 of the slide bar 320 may receive an elastic force from the elastic member 310 as much as to be spaced from the first bus bar 200a and the second bus bar 200b, and thus may not contact the first bus bar 200a and the second bus bar 200b.

Figure 9:
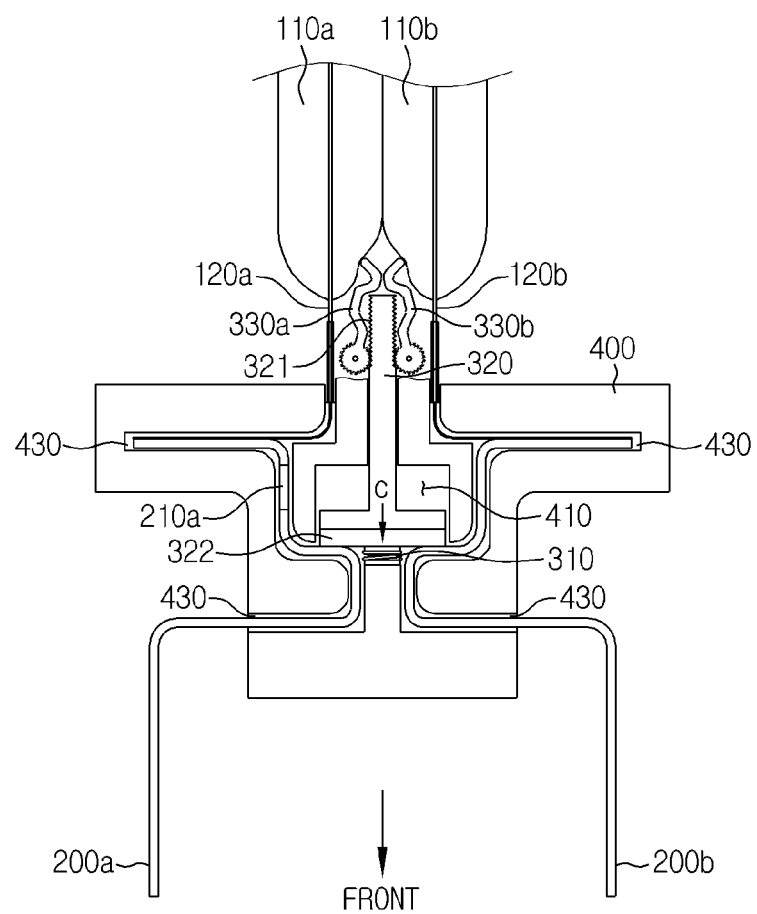
FIG. 9 is a diagram showing the top surface of the battery module according to an embodiment of the present disclosure, after its volume increases.

FIG. 9 is a diagram showing the top surface of the battery module according to an embodiment of the present disclosure, after its volume increases.

Referring to FIG. 9 further, if the battery module is overcharged, the volume of at least one of the first battery cell 110a and the second battery cell 110b may increase. At this time, if the volume of the first battery cell 110a increases, an expansive force may be applied to the first expansive force transmitting unit 330a, and, if the volume of the second battery cell 110b increases, an expansive force may be applied to the second expansive force transmitting unit 330b.

Hereinafter, a process of preventing overcharge of the battery module when the volume of both the first battery cell 110a and the second battery cell 110b is increased will be described.

As described above, if the volume of the first battery cell 110a and the second battery cell 110b increases due to the overcharge of the battery module, the first expansive force transmitting unit 330a and the second expansive force transmitting unit 330b may receive an expansive force oriented to the front.

After that, the first expansive force transmitting unit 330a and the second expansive force transmitting unit 330b may transmit the expansive force to the gear-coupled slide bar 320, and the slide bar 320 receiving the expansive force may move in a direction (c) toward the first bus bar 200a and the second bus bar 200b. Finally, the short-circuit terminal 322 placed at the other end of the slide bar 320 may contact the first bus bar 200a and the second bus bar 200b to electrically connect the first bus bar 200a and the second bus bar 200b.

By doing so, the circuit including the short-circuit terminal 322, the first bus bar 200a and the second bus bar 200b may form a short circuit.

For this, the short-circuit terminal 322 may be made of a conductive material.

As described above, in the battery module according to an embodiment of the present disclosure, if the volume of the first battery cell 110a and the second battery cell 110b increases due to the overcharge, the short-circuit unit 300 may receive an expansive force from the first battery cell 110a and the second battery cell 110b to move toward the first bus bar 200a and the second bus bar 200b and electrically connect the first bus bar 200a and the second bus bar 200b, thereby generating a short circuit.

Meanwhile, not only in the case where the volume of both the first battery cell 110a and the second battery cell 110b increases but also in the case where the volume of any one of the first battery cell 110a and the second battery cell 110b increases, the short-circuit unit 300 may electrically connect the first bus bar 200a and the second bus bar 200b to cause a short circuit.

More specifically, if the volume of only the first battery cell 110a increases, the slide bar 320 may receive an expansive force from only the first expansive force transmitting unit 330a to move toward the first bus bar 200a and the second bus bar 200b.

That is, even though the volume of only the first battery cell 110a increases, the slide bar 320 may receive the expansive force due to the volume increase and move toward the first bus bar 200a and the second bus bar 200b to generate a short circuit by electrically connecting the first bus bar 200a and the second bus bar 200b.

On the contrary, if the volume of only the second battery cell 110b increases, the slide bar 320 may move toward the first bus bar 200*a* and the second bus bar 200*b* by receiving the expansive force from only the second expansive force transmitting unit 330*b*.

In other words, even though the volume of only the second battery cell 110*b* increases, the slide bar 320 may receive the expansive force according to the volume increase and move toward the first bus bar 200*a* and the second bus bar 200*b* to generate a short circuit by electrically connecting the first bus bar 200*a* and the second bus bar 200*b*.

Hereinafter, the circuit configuration according to the movement of the short-circuit unit of the battery module according to an embodiment of the present disclosure will be described.

Figure 10:
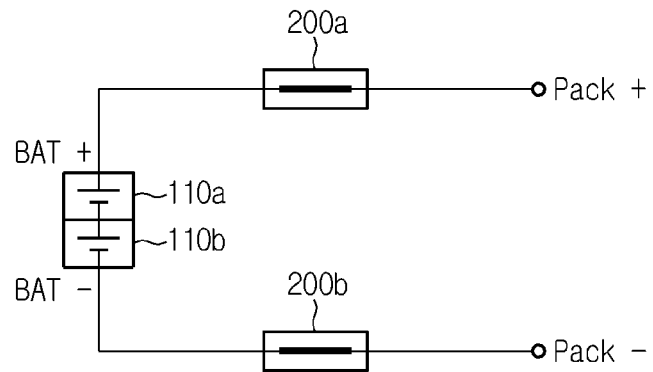
FIG. 10 is an equivalent circuit diagram before overcharge occurs at the battery module according to an embodiment of the present disclosure.
Figure 11:
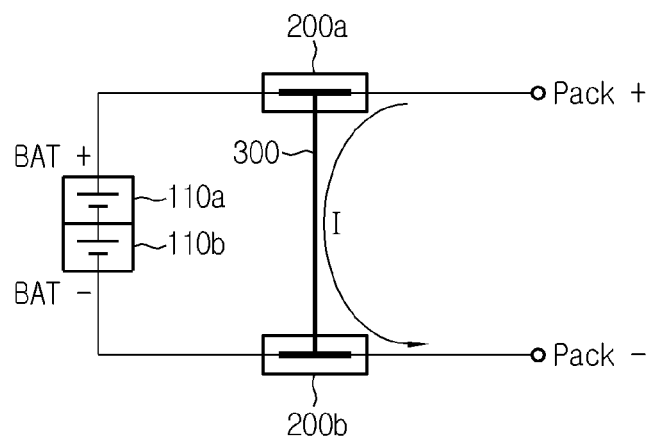
FIG. 11 is an equivalent circuit diagram just after a short-circuit unit moves after overcharge occurs at the battery module according to an embodiment of the present disclosure.
Figure 12:
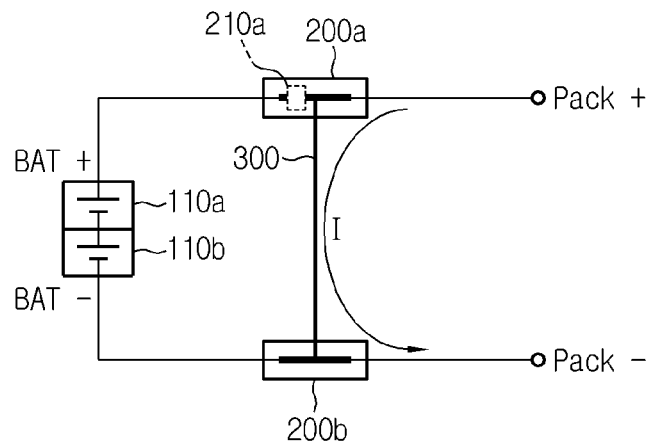
FIG. 12 is an equivalent circuit diagram after the short-circuit unit moves to fracture the fracturing portion after overcharge occurs at the battery module according to an embodiment of the present disclosure.

FIG. 10 is an equivalent circuit diagram before overcharge occurs at the battery module according to an embodiment of the present disclosure, FIG. 11 is an equivalent circuit diagram just after a short-circuit unit moves after overcharge occurs at the battery module according to an embodiment of the present disclosure, and FIG. 12 is an equivalent circuit diagram after the short-circuit unit moves to fracture fracturing portion after overcharge occurs at the battery module according to an embodiment of the present disclosure.

Referring to FIGS. 10 to 12, if the battery module according to the present disclosure is not overcharged but operates normally, as shown in FIG. 10, the volume of the battery cell 110*a* and the second battery cell 110*b* does not increase, and thus the first bus bar 200*a* and the second bus bar 200*b* may not cause an electrical short circuit.

However, as shown in FIG. 11, if the battery module according to the present disclosure is overcharged to increase the volume of at least one of the first battery cell 110*a* and the second battery cell 110*b*, the short-circuit unit 300 may receive an expansive force to move toward the first bus bar 200*a* and the second bus bar 200*b*. Accordingly, the short-circuit terminal 322 (FIG. 8) of the short-circuit unit 300 may contact the first bus bar 200*a* and the second bus bar 200*b* and electrically connect the first bus bar 200*a* and the second bus bar 200*b* to generate a short circuit.

By doing so, a short circuit including the short-circuit unit 300, the first bus bar 200*a* and the second bus bar 200*b* is formed so that a high current I may flow.

After that, if the high current I flows continuously at the first bus bar 200*a*, as shown in FIG. 12, the fracturing portion 210*a* having great resistance due to a narrow cross section generates high-temperature resistance heat and thus is fractured, thereby cutting the power supplied from the external power source to the battery module and thus preventing the overcharge.

Figure 13:
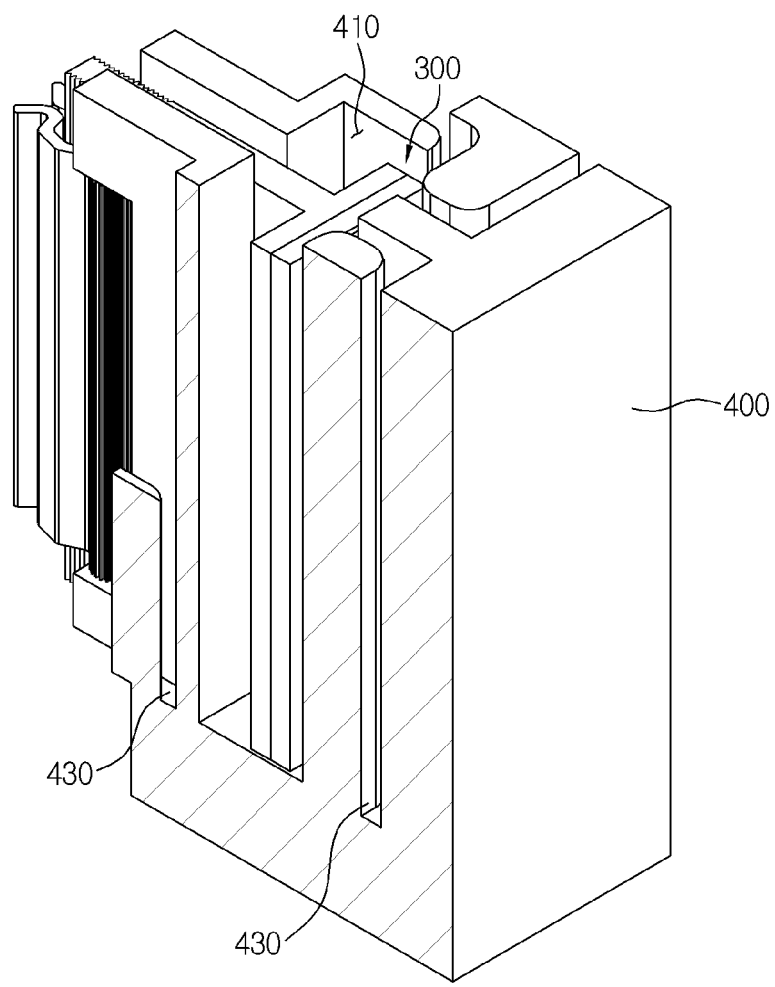
FIG. 13 is a diagram showing a section of the cartridge of the battery module according to an embodiment of the present disclosure.
Figure 14:
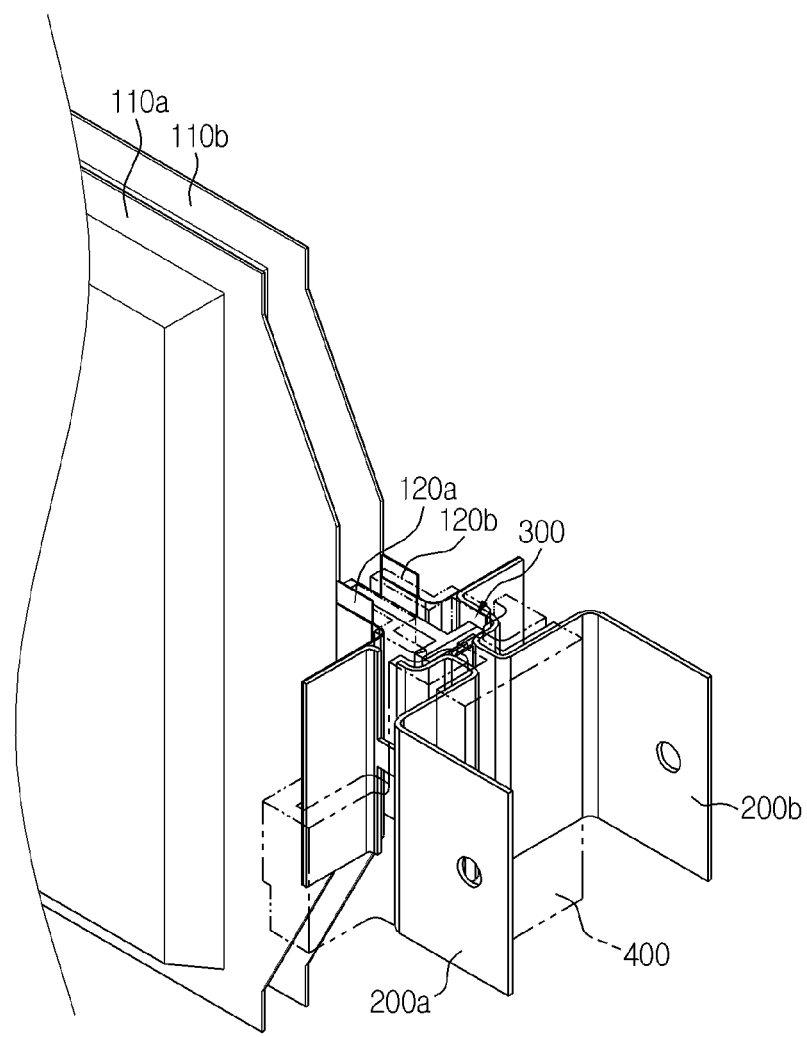
FIG. 14 is a perspective view showing an inside of a cartridge of the battery module according to an embodiment of the present disclosure.

FIG. 13 is a diagram showing a section of the cartridge of the battery module according to an embodiment of the present disclosure, and FIG. 14 is a perspective view showing an inside of a cartridge of the battery module according to an embodiment of the present disclosure.

Referring to FIGS. 13 and 14, the cartridge 400 may be located between the first battery cell 110*a* and the second battery cell 110*b* to accommodate or support a part of the first electrode lead 120*a* of the first battery cell 110*a*, the second electrode lead 120*b* of the second battery cell 110*b*, the first bus bar 200*a*, the second bus bar 200*b* and the short-circuit unit 300.

More specifically, the cartridge 400 may support the first electrode lead 120*a* of the first battery cell 110*a* and the first bus bar 200*a*, which are in surface contact with each other to be electrically connected, at a lower portion thereof, and may support the second electrode lead 120*b* of the second battery cell 110*b* and the second bus bar 200*b*, which are in surface contact with each other to be electrically connected, at a lower portion thereof.

For this, the cartridge 400 may have a support groove 430 formed to have a shape corresponding to the bending shape of the first electrode lead 120*a* of the first battery cell 110*a*, the second electrode lead 120*b* of the second battery cell 110*b*, the first bus bar 200*a* and the second bus bar 200*b*.

Meanwhile, the cartridge 400 may have an accommodation portion 410 formed therein with a shape corresponding to an appearance of the short-circuit unit 300 and an appearance of the short-circuit unit 300 to accommodate the short-circuit unit 300 therein.

At this time, the accommodation portion 410 of the cartridge 400 may be formed to correspond to the volume when the elastic member 310 of the short-circuit unit 300 is restored from a deformed state.

That is, the accommodation portion 410 of the cartridge 400 may be formed to correspond to the volume that changes when the elastic member 310 (FIG. 7) of the short-circuit unit 300 repeats deformation and restoration.

In other words, the accommodation portion 410 may be formed at the inside of the cartridge 400 to have a shape corresponding to an appearance of the short-circuit unit 300.

The battery module according to the present disclosure may improve the stability of the battery module by fracturing the first bus bar accurately when the battery cell abnormally expands to cut off the power supplied from the external voltage source and thus prevent the overcharge of the battery module.

Meanwhile, a battery pack according to the present disclosure includes at least one battery module as described above. At this time, in addition to the battery module, the battery pack may further include a case for accommodating the battery module, and various devices for controlling charge/discharge of the battery module such as a battery management system (BMS), a current sensor and a fuse. In particular, the battery pack according to an embodiment of the present disclosure may include the first bus bar, the second bus bar, the short-circuit unit and the cartridge at each battery module to cut off the power supplied from the external voltage source by fracturing the first bus bar when the battery cell abnormally expands, so that overcharge is prevented for each battery module.

The battery module according to the present disclosure may be applied to a vehicle such as an electric vehicle and a hybrid vehicle. That is, the vehicle according to the present disclosure may include the battery module of the present disclosure.

The present disclosure can be substituted, modified or changed in various ways without departing from the scope of the present disclosure by those skilled in the art and thus is not limited to the above embodiments and the accompanying drawings.

What is claimed is:
1. A battery module, comprising:
a first bus bar electrically connected to a first electrode lead of a first battery cell;
a second bus bar electrically connected to a second electrode lead of a second battery cell;
a short-circuit unit configured to move toward the first bus bar and the second bus bar by receiving an expansive force due to a volume increase of at least one of the first battery cell and the second battery cell to electrically connect the first bus bar to the second bus bar and to generate a short circuit; and a cartridge configured to accommodate or support at least a portion of the first electrode lead, the second electrode lead, the first bus bar, the second bus bar and the short-circuit unit, wherein the short-circuit unit includes:

an elastic member having a first end supported to an inner side of the cartridge and configured to provide an elastic force in a direction opposite to a direction of the expansive force;

a slide bar having a short-circuit terminal provided at a first end of the slide bar to contact a second end of the elastic member opposite the first end of the elastic member and receive the elastic force from the elastic member, the slide bar having a rack gear formed along a surface of a second end of the slide bar opposite to the first end of the slide bar; and an expansive force transmitting unit having a pinion gear provided at a first end of the expansive force transmitting unit to engage with the rack gear and support the second end of the slide bar, the expansive force transmitting unit having a second end opposite to the first end of the expansive force transmitting unit, wherein the second end of the expansive force transmitting unit is in contact with one end of each of the first battery cell and the second battery cell to receive the expansive force.

2. The battery module according to claim 1, wherein when the volume of both the first battery cell and the second battery cell does not increase, the slide bar receives only the elastic force so that the short-circuit terminal is spaced apart from the first battery cell and the second battery cell.

3. The battery module according to claim 1, wherein when the volume of at least one of the first battery cell and the second battery cell increases, the expansive force transmitting unit receives the expansive force to move toward the first bus bar and the second bus bar and transmits the received expansive force to the slide bar through the rack gear engaged with the pinion gear.

4. The battery module according to claim 1, wherein when the volume of at least one of the first battery cell and the second battery cell increases, the slide bar receives the expansive force through the rack gear engaged with the pinion gear to move toward the first bus bar and the second bus bar.

5. The battery module according to claim 1, wherein the short-circuit terminal comes into contact with the first bus bar and the second bus bar and electrically connects the first bus bar and the second bus bar to generate a short circuit.

6. The battery module according to claim 1, wherein the short-circuit terminal is made of a conductive material.

7. The battery module according to claim 1, wherein the cartridge has an accommodation portion formed therein with a shape corresponding to a shape of the short-circuit unit to accommodate the short-circuit unit therein.

8. The battery module according to claim 7, wherein the accommodation portion corresponds to the volume of an elastic member according to a restoring state of the elastic member.

9. The battery module according to claim 1, wherein the cartridge supports at least a portion of each of the first electrode lead and the first bus bar that are in surface contact with each other and are electrically connected, and supports at least a portion of each of the second electrode lead and the second bus bar that are in surface contact with each other and are electrically connected.

10. The battery module according to claim 1, wherein at least one of the first bus bar and the second bus bar further includes a fracturing portion that is fractured to cut an electric connection to the outside when the short circuit is generated.

11. A battery pack comprising a battery module according to claim 1.

12. A vehicle comprising a battery module according to claim 1.

* * * * *